United States Patent [19]

Cox et al.

[11] 4,066,400

[45] Jan. 3, 1978

[54] BUOYANT SOLID COVER FOR PONDS AND METHOD OF MAKING THE SAME

[76] Inventors: James P. Cox, 246 E. Bartlett Road, Lynden, Wash. 98264; Robert W. Beach, 4262 NE. 125th, Seattle, Wash. 98125

[21] Appl. No.: 630,997

[22] Filed: Nov. 12, 1975

[51] Int. Cl.² ............................................... B01J 1/18
[52] U.S. Cl. .............................. 21/60.5 R; 21/60.5 A; 252/384
[58] Field of Search ........................ 21/60.5 R, 60.5 A

[56] References Cited

U.S. PATENT DOCUMENTS

| | | | |
|---|---|---|---|
| 3,070,419 | 12/1962 | Malick | 21/60.5 R |
| 3,095,263 | 6/1963 | Eckert | 21/60.5 R |
| 3,113,924 | 12/1963 | Mendius, Jr. | 21/60.5 R X |
| 3,199,944 | 8/1965 | Gabor | 21/60.5 R |
| 3,273,957 | 9/1966 | Beredjick | 21/60.5 R |
| 3,431,064 | 3/1969 | Fox | 21/60.5 R |
| 3,437,421 | 4/1969 | Harwood | 21/60.5 R |
| 3,458,274 | 7/1969 | Cashman | 21/60.5 R |
| 3,459,492 | 8/1969 | Cawley | 21/60.5 R |
| 3,531,239 | 9/1970 | Rowlette | 21/60.5 R |
| 3,549,313 | 12/1970 | Eckert | 21/60.5 R |
| 3,797,998 | 3/1974 | Bourne | 21/60.5 R |

OTHER PUBLICATIONS

K. Cooley, Water Resources Research, vol. 6, No. 3, 717–727 (June 1970).
K. Cooley et al., Jour. of the Irrigation and Drainage Div., Proceedings of the American Soc. of Civil Engineers, vol. 99, No. IR 3, pp. 353–363 (Sept. 1973).
A. F. Thoma, Jour. of the Irrigation and Drainage Div., Proceedings of the American Soc. of Civil Engineers, No. 1R 3, 397–398 (Sept. 1974).

*Primary Examiner*—Sidney Marantz
*Attorney, Agent, or Firm*—Robert W. Beach; Ward Brown

[57] ABSTRACT

Solidifiable petroleum wax is placed in liquid form to solidify on the surface of a pond, such as a degradant lagoon for deterring emanation of malodorous gases or collecting malodorous or energy latent gases, or a reservoir to deter evaporation. The entire cover can be of liquid solidified in situ on the surface of the pond or a sheet cover can be formed by placing solidifiable buoyant material in liquid form between premolded solid cover sections or cakes to which the liquid can bond in solidifying to join adjacent premolded sections. The premolded cakes and/or the buoyant material solidified in situ can include reinforcement, such as net, which preferably also is buoyant. A suitable solidifiable buoyant material is petroleum wax which can include woody material such as sawdust or shavings, serving as an adsorbent, filler and/or vehicle for treating materials, and/or other additives such as oxidizer material, deodorant material, catalysts, enzymes and/or nutrients for anaerobic bacteria.

32 Claims, No Drawings

BUOYANT SOLID COVER FOR PONDS AND METHOD OF MAKING THE SAME

BACKGROUND OF THE INVENTION

1. Field of the Invention

The present invention relates to covers for ponds including buoyant solid material which can be applied to the surface of a pond in liquid form and will solidify either upon cooling or upon evaporation of solvent used to liquify the wax.

2. Prior Art

Degradant lagoons, i.e. lagoon used for the natural oxidation or degradation of sewage and other organic wastes, have been objectionable because of malodorous gases emanating from them. It has been proposed to reduce the emanation of such gases by floating on the surface of such lagoons hollow polyethylene spheres so as to reduce the exposed surface area of such lagoons. It has also been proposed to cover such a lagoon with an extremely thin layer of cetyl alcohol.

To deter evaporation from water reservoirs, it has been proposed to cover the surface of the reservoir with a very thin layer of a hydrophobic liquid.

As an expedient for generating solar energy, large polyethylene disks have been proposed to be floated in swimming pools to increase the transfer of the sun's heat into the water and retard radiation of heat to the atomosphere during the night.

SUMMARY OF THE INVENTION

It is a principal object of the present invention to provide a cover for a pond which utilizes a buoyant material that can be placed in liquid condition on the surface of the pond for solidification to constitute all or a portion of the pond cover.

A further object is to utilize buoyant material which can be placed on the surface of a pond in liquid condition and bond to buoyant solid material particles, pieces or cakes floating on the pond to provide a composite cover.

It is also an object to provide for buoyant material that can be applied in liquid condition to a surface of a pond reinforcement for embedment in such material when it has solidified.

Another object of the invention is to utilize buoyand solid material for a pond cover, which can include additive for improving its buoyancy and/or to provide treatment for material in the pond.

An additional object is to provide buoyant material which can be applied to the surface of a pond in liquid condition and which will solidify and which is easy to place and economical.

The foregoing objects can be accomplished by utilization of petroleum was as the buoyant material that can be applied to the surface of a pond in liquid form and will solidify in situ. Reinforcement for such material can be net embedded in the petroleum wax.

DETAILED DESCRIPTION

The same general material and technique for making a pond cover can be utilized whether the pond is a degradant lagoon or a domestic water supply reservoir. The only difference resides in the type of additives which might be used with the buoyant solid material with which the invention is particularly concerned. In either case, it is preferred that as much of the surface of the pond as practical be covered by a sheet cover of buoyant solid material. It is also preferable that the cover float on the surface of the pond, although, in some instances or for some period of time, the cover might be suspended above the surface of the pond. Such a cover will deter freezing of the pond surface in cold weather and evaporation of liquid from the pond.

The cover for the pond surface can be made by utilizing either of two principal techniques. The first technique involves simply placing on the surface of the pond buoyant material in liquid form having the characteristic of solidifying in situ on the pond surface to produce a sheet cover. The other method is first to place on the surface of the pond solid premolded sections of the cover in the form of cakes, which preferably also are made of material which is buoyant when in liquid form, and then placing between such cakes buoyant material in liquid condition which will solidify and in solidifying will bond to the premolded cakes and join them in a continuous sheet.

Whichever technique is used for making the pond cover, it is desirable to provide reinforcement for such cover, preferably in the form of a net embedded in the buoyant solid material. Also, whichever technique is used for making the cover, it is necessary to arrange for access to the surface of the pond to enable the buoyant material in liquid condition to be placed conveniently. In addition, the cover must be controlled after it has been completed so that it will be maintained in the desired position on the surface of the pond instead of being moved undesirably by wind or even by changes in elevation of the surface of the pond.

Whichever method is used to make the pond cover, it is necessary to deposit buoyant material on the surface of the pond in liquid form for solidification so as to produce a consolidated cover. Consequently, material must be selected which is buoyant both in liquid condition and in solid condition, which can be placed easily in liquid condition and which will solidify reasonably quickly in the cover-making procedure.

The material of which the cover is made should not only be buoyant both in liquid and in solid condition, but should be inert and nonporous so that it will not be readily contaminated either by the contents of a lagoon or by ambient atmosphere. The material should be insoluble and hydrophobic having a relatively low melting point between 52° C., i.e. 125.6° F., and 90° C., i.e. 194° F., and should have a relatively high evaporation temperature such as several hundred degrees Celsius or Fahrenheit. Also the material should be inexpensive.

A material meeting all these qualification is liquefiable buoyant wax, especially petroleum wax, and, more particularly, paraffin wax and/or microcrystalline wax. Both waxes have the chemical formula of $C_nH_{2n+2}$. For paraffin wax the average value of $n$ may be 26 to 30, a mixture of which hydrocarbons may provide a melting point from 52° to 57° C. or 125° to 135° F. Microcrystalline wax contains compounds of higher molecular weight but of the same formula, so that the melting point is higher and may be as high as 90° C., i.e. 194° F. Petroleum wax preferred for the purpose of the present invention has the average formula of $C_{36}H_{74}$ and has a melting point of 80° C., i.e. 176° F. Moreover, such wax is miscible in all proportions with spermaceti; which is principally cetyl palmitate. Part or all of the wax can be synthetic paraffin wax having the above general formula of petroleum wax in whih the value of $n$ is 50 to 55 and the melting point is 214° to 220° F., i.e. 101° to 105° C.

In utilizing petroleum wax to make a pond cover according to the present invention, such wax can be liquefied and propelled through a hose by the use of steam, which preferably is superheated, or by pumping. The hose itself can be heated electrically to maintain the petroleum wax in melted condition until it is dispensed from the discharge end of the hose. Alternatively, the wax can be liquefied by solvent. Moreover, the liquid wax can be poured onto the surface of the pond instead of being ejected from a hose. Also the liquid was thus being placed can be mixed with buoyant particles of woody material of stable foam such as polystyrene material. In order to enable the buoyant liquid to be placed at desired locations over the surface of the pond, it may be desirable to provide a network of walkways of floats lacing the surface of the pond if it is of considerable extent. Such walkways or floats will also provide support for the hose out from shore. Alternatively, the buoyant liquid material could be discharged from a helicopter.

Suitable solvent for petroleum wax include benzene ($C_6H_6$), chloroform ($CHCl_3$), ether ($C_4H_{10}O$), carbon disulfide ($CS_2$) and essential oils. Chlorinated petroleum wax is miscible with benzene, chloroform, ether and carbon tetrachloride ($CCl_4$).

Whether the entire area of the solid cover is placed in liquid form or a portion of it is placed in premolded sections and the remainder is formed in situ by placing buoyant liquid between the premolded sections, it is desirable to provide a mooring or anchoring arrangement for maintaining the desired location of the cover on the pond. The solid cover may extend over only the central portion of the pond, and the margin of the pond can remain uncovered or be covered by flimsy sheet material forming a peripheral skirt bridging the gap from the cover of the present invention to the margin of the pond. Preferably the underside of the cover is convex to promote flow of gas emanating from the pond to the periphery of the cover. Such gas can be collected from the space under such skirt. The solid cover can be moored to piles or stationary walkways in the central portion of the pond, or the cover can be moored to the shore, or the cover can be connected at various locations to anchors resting on the bottom of the pond. Lines can be connected to bars of wood or metal embedded in the buoyant material of the cover or lines can extend through apertures in the cover and be secured to bars at the opposite side of the cover.

One arrangement for maintaining the cover in a desired location on a pond can utilize piles driven at spaced locations in the pond. A loose fitting collar can be provided around each pile, and the cover material can surround such collar. As the level of the pond surface rises and falls, the collar encircling each pile will be raised and lowered correspondingly. Alternatively, spikes can be driven into each pile at an elevation at which they will become embedded in solidifying buoyant material of the cover. If the level of the pond drops portions of the cover adjacent to the piles will be suspended from the piles. Such a construction may be used intentionally to provide gas-collection pockets encircling the piles beneath the cover.

Whichever placement technique is used, provision can be made for removal or escape of gas from a degradant lagoon and for removal or drainage into the pond of excessive water that may collect on the surface of the cover from rain. Apertures may be provided through the cover at intervals, both to allow gas to escape and to allow water on the surface of the cover to drain into the pond. Provision can be made for collecting gas either to be deodorized or to be burned or perhaps to be used as fuel depending upon the composition of the gas. The gas may contain sulphur dioxide, hydrogen sulfide, methylmercaptan, ammonia, methane, trimethylamine, secondary and tertiary amines, geosmin and/or other hydrocarbon gases.

The completed cover preferably is a continuous sheet, the thickness of which will depend upon the size of the pond. The sheet can be from 3/16 in. to 12 in. [5 mm to 30.5 cm] in thickness, as a practical range. If the cover contains reinforcement net, the cover should be between ½ in. and 12 in. [12.7 mm and 30.5 cm] thick and the reinforcement net should be at or adjacent to the lower surface of the cover sheet. Such location of the reinforcement is particularly important if any portion of the cover should be suspended above the surface of the pond at any time.

Utilizing the first techhnique for making the cover, the petroleum wax is heated to a temperature sufficiently high to melt it and it is dispensed from the discharge end of a hose by the use of superheated steam as a vehicle and placed on the surface of the pond progressively from one area to the next. The water of the pond will cool the liquid petroleum wax so that it will solidify and form a continuous sheet. The temperature of the wax should be high enough, or the amount of solvent used should be sufficient, to enable the wax to flow evenly over a considerable area of the pond before soldifying. If there should be any gaps in the sheet, liquid petroleum wax can be placed in them and, in solidifying, the gaps will be filled. If a rupture should occur at any time in any area of the cover, it can be repaired easily simply by placing liquid petroleum wax in the rupture to solidify and bond to the edges of the rupture.

The cover can be made by placing a single layer of liquid petroleum wax; but, if the cover is to be of substantial thickness, it should be formed by successive layers of wax, each layer of which can be a quarter to one-half inch thick [6 mm to 13 mm], for example. If reinforcement net is to be embedded in the cover, such net should be floated directly on the surface of the pond before any buoyant liquid is placed; or, if the cover is to be quite thick, the reinforcement net can be placed on the first or second layer of buoyant material. Particularly if the net reinforcement is to be placed directly on the surface of the pond, it should be of buoyant material such as polypropylene. The thicker the cover is to be, the coarser the net may be and the larger the mesh.

If the cover is for a degradant lagoon from which gases emanate, the cover can be made downwardly convex by forming a preliminary reinforced layer of perhaps an inch in thickness and suspending such sheet by its margin while lowering the pond level. A layer of warm liquid wax can then be placed on the upper surface of the sheet cover to soften it so that the central portion of the sheet will sag a few inches below the margin. Warm liquid wax may then be added to make the upper surface flat so that the central portion will be four to eight inches thick, for example, while the margin will be one to two inches thick. If the level of the pond is raised again after the wax has hardened, the rigid cover will float with its peripheral portion spaced a few inches above the surface of the lagoon. Gas emanating from the lagoon will rise to the periphery of the sheet cover.

In utilizing the second technique of making the cover, solid buoyant sections, preferably principally or entirely of premolded petroleum wax, can be separate units or cakes, or sections connected by net reinforcement. Such net can be made of fibrous strand material. If the sections or cakes are separate, they can be of different materials and profiles, although sections for any particular cover are preferably of the same type of profile and size. Cakes can be of premolded petroleum wax alone or with buoyant additives such as sawdust or wood chips, or can be of polystyrene or polyurethane foam, or even of wood. The cakes can be of circular, square or hexagonal profile, for example. The width of such cakes can be from 3 to 7 inches [7 cm to 18 cm] and the thickness from 3/16 to 1/2 inch [5 mm to 13 mm]. Such cakes would not be reinforced.

Small cakes of the type described above would be of some benefit if they were simply placed on the surface of a pond as discrete units forming a discontinuous cover because they would reduce the area of the exposed surface of the pond from which malodorous gases could emanate or from which water would evaporate. It is preferred, however, that the cover sections be connected into a continuous sheet. Connection of the discrete units can be effected by placing buoyant liquid petroleum wax between such units to bond to their edges and integrate such units into a continuous sheet. As in utilizing the first technique, the buoyant liquid can be placed in any number of successive layers and can flow over the upper surfaces of the discrete units if the final thickness of the continuous sheet is to be greater than the original thickness of the premolded units.

Premolded sections of buoyant material, preferably petroleum wax, can be individually reinforced such as by net reinforcement, and such net reinforcement can itself connect premolded units flexibly. Thus, for example, the premolded units could be three or four feet [0.9 m to 1.2 m] square, each unit having net reinforcement embedded adjacent to one surface and adjacent premolded units can be connected by a stretch of uncovered net reinforcement from a few inches to a foot or so in width can be doubled over to enable premolded units in a string to be stacked in accordian-pleated relationship for shipping or storage. Strips of uncovered net reinforcement can project from opposite edges of each of several strings of cover sections so that edge strips of adjacent strings floating on the surface of a pond can be placed and suitably held, such as by clips, in overlapping relationship. The adjacent cover sections in each string and the cover sections in adjacent strings can then be integrated into a continuous sheet cover by placing buoyant liquid between the premolded sections in each string and between the strings to bond to such sections in solidifying.

Again, the amount of buoyant liquid placed on the surface of the pond between the premolded solid sections can be sufficient to overflow such sections to increase the final thickness of the cover beyond the initial thickness of the premolded sections. In thus integrating the premolded sections, the petroleum wax solidifying in situ will embed the reinforcement net in the solidified material so that the final sheet will be substantially continuously reinforced over its entire area.

Instead of providing only strings or rows of premolded cover sections, a plurality of such rows can be joined by net reinforcement, which net can subsequently be embedded in buoyant material solidified in situ on the surface of the pond. Providing premolded cover sections joined in strings by net reinforcement or arranged in a plurality of strings connected by net reinforcement affords much better control over placement of the buoyant liquid than is possible if the buoyant liquid is simply placed by itself on the surface of the pond in accordance with the first technique described above. Moreover, utilization of premolded cover sections connected by net reinforcement provides better control over the placement of the liquid petroleum wax than placement of such liquid between disconnected discrete cover elements.

Another advantage in using premolded cover sections three or four feet square connected by net reinforcement instead of discrete elements several inches in width is that all or some of the sections can be specially formed for a particular purpose to be used on degradant lagoons. Such a larger square cover section can be formed of shallow dome configuration and placed on the surface of a lagoon with its concave side down so as to form a pocket for collection of gas emanating from the liquid of the lagoon. Such gas could be collected by hoses connecting the dome pockets or a reservoir for each dome could be supported on top of the domed cover section, and such reservoirs could be connected by hoses.

Alternatively, instead of attempting to collect and use gas emanating from the lagoon, such as for fuel, the collected gas could simply rise through a body of deodorant material to deodorize the gas or be burned before it escapes into the atmosphere. Such channeling of the emanating gas through predetermined escape passages enables the gas to be treated much more effectively for deodorizing it than if emanating gas is simply allowed to escape around the edges of a sheet cover or between disconnected discrete comparatively small cover units.

Deodorizing treating material through which emanating gas could pass from beneath the lagoon cover to atmosphere, or which could be used to treat such gas, includes such substances as oxidizers, essential oils, catalysts, polymerizers and/or adsorbents. Examples of such substances are:

Oxidizers: Potassium permanganate ($KMnO_4$), chlorine ($Cl_2$), sulfur dioxide ($SO_2$), hydrogen peroxide ($H_2O_2$), sodium bisulfite ($NaHSO_3$), oxygen ($O_2$), biphenyl ($C_{12}H_{10}$), calcium hypochlorite ($CaO_2Cl_2$), and acids such as sulfuric acid ($H_2SO_4$), hydrochloric acid (HCl), and glacial acetic acid ($C_2H_4O_2$).

Essential Oils: Methyl salicylate, pine oil, cedar oil, cedarleaf oil, lemon oil, esters of lemon oil, camphene ($C_{10}H_{16}$), limonene ($C_{10}H_{16}$), eucalyptus oil, citronella oil, vanillin, as well as 3-butene-2-one ($C_4H_6O$), 2,3-butanedione ($C_4H_6O_2$), amyl acetate ($C_7H_{14}O_2$), butyl acetate ($C_6H_{12}O_2$), $\alpha$-ionone ($C_{13}H_{20}O$), $\beta$-ionone ($C_{13}H_{20}O$), and citronellyl acetate ($C_{12}H_{22}O_2$).

Catalysts: zinc ions, copper ions, iron ions, sulfur ions, nickel ions, iodine ions, cobalt ions, ferric hydroxide $4Fe(OH)_3$, iron rust ($Fe_2O_3$) or ($Fe_2O_4$), silver (Ag), chromium (CR), nickel (Ni), platinum (Pt), manganese (Mn), manganese dioxide ($MnO_2$), thiosulfate (HCHS) type catalysts, nickel sulfide (NiS), cobalt sulfide (CoS), iron sulfide (FeS), palladium (Pd), Cupric oxide (CuO), chromic oxide ($Cr_2O_3$), manganese oxide ($Mn_3O_4$), cobaltic oxide ($Co_2O_3$), nickel monoxide (NiO), glacial acetic acid ($C_2H_4O_2$), vanadium oxide ($V_2O_5$), aluminum oxide ($Al_2O_3$), sulfuric acid ($H_2SO_4$), zinc oxide (ZnO). Biological catalysts, which will in most cases require an adsorbent or an absorbent to act as a vehicle, include α,β-amylase, lipase, catalase, cellulase, phosphatase, peroxidase, hyaluronidase, trypsin, erepsin, bromelain, papain, rennin, ficin, fungal proteases, bacterial proteases and pepsin.

Polymerizers: glutaraldehyde ($C_5H_8O_2$) and formaldehyde ($CH_2O$).

Adsorbents: Charcoal, kieselguhr, clay (see *Kirkothmer Encyclopedia of Chemical Technology*, volume 1, page 460), activated alumina, activated bauxite, aluminosilicate, carbons, iron oxide and silica gel.

Alternatively, or additionally, the escape of gas emanating from the lagoon and discharged through predetermined passages could be controlled to be vented at particular times such as by valves controlled by photoelectric cells so that gas would escape into the atmosphere only at night. Timers could be used instead of or in addition to such photoelectric cells to vent the gas only in the early morning hours when it would be least disturbing to residents of the vicinity.

Instead of the cover sections being molded of concave downward shape they can be molded of convex downward shape to provide margins spaced above the surface of the pond when they are floating. Buoyant pipes having lower surfaces perforated to communicate with the channels beneath the premolded section margins can then be embedded in the reinforced joining strips of wax solidified in situ to serve as a gas collection pipe network leading to the margin of the entire cover.

In addition to providing deodorants for deodorizing gas emanating from a lagoon, the cover could carry a treating additive or additives for improving the degradant action in the lagoon. Liquid petroleum wax will dissolve a large amount of chlorine which would be liberated over an extended period of time. The chlorine expedites oxidation of organic matter in the lagoon and the slow release prolongs the effectiveness of the chlorine. Masking materials such as essential oils, sawdust, partially charcoalized wood or charcoal could be incorporated into the cover to serve as adsorbents. Anaerobic nutrients may be provided to improve the action of bacteria in the lagoon. Such nutrients include trace metals such as zinc, copper, iron, manganese and aluminum. Enzymatic action can be facilitated by providing in the cover enzymes such as proteinases, for example trypsin, or enzyme activators such as sodium chloride (NaCl) or ammonium chloride ($NH_4Cl$).

To enable a sheet cover of petroleum wax to be removed for dredging the lagoon or for any other purpose, sections of the sheet cover can be separated by divider strips which are not strongly adherent to the petroleum wax. Such divider strips could be formed by the gas-collecting pipes. The cover sections within an area bounded by such strips can be lifted as a unit particularly if such unit is reinforced by embedded mesh reinforcement. Except at times when it is desired to remove a lagoon cover section by section, the sections on opposite sides of each divider strip can be connected by lines to hold the sections in substantial contact with the divider strips. If the cover is not reinforced and is in the form of a continuous sheet, the cover can be separated into sections by melting the wax along a line with a torch or cutting it with a suitable cutting implement.

When the cover is to be replaced, severed sections can readily be reunited simply by placing liquid petroleum wax at the junctions of the sections so that, in solidifying, such liquid wax will bond the sections together again.

I claim:

1. A buoyant solid sheet pond cover comprising petroleum wax of a thickness of at least 3/16 in., and reinforcement integral with the petroleum wax.

2. The cover defined in claim 1, in which at least a portion of the cover is preformed.

3. The cover defined in claim 1, in which the cover is a composite of preformed sections joined by solidified in situ petroleum wax.

4. The cover defined in claim 1, in which the reinforcement is buoyant.

5. The cover defined in claim 1, in which the reinforcement is fibrous.

6. The cover defined in claim 1, in which at least a portion of the cover is preformed, and reinforcement embedded in the preformed portion of the cover.

7. The cover defined in claim 1, in which a portion of the cover is formed by sections of preformed buoyant material and a portion of the cover is solidified in situ buoyant material joining said sections of preformed buoyant material, and reinforcement net embedded in the solidified in situ portion of the cover.

8. The cover defined in claim 1, in which the reinforcement is a net.

9. The cover defined in claim 8, in which at least a portion of the reinforcement net is embedded in solidified in situ petroleum wax.

10. The cover defined in claim 1, in which the cover is floating on a degradant lagoon, and an additive carried by the petroleum wax including treating material.

11. The cover defined in claim 10, in which the treating material includes a deodorant.

12. The cover defined in claim 10, in which the additive includes an oxidizer.

13. the cover defined in claim 10, in which the additive includes anaerobic nutrient material.

14. A buoyant solid sheet pond cover comprising petroleum wax of a thickness of at least 3/16 in., and nonliquefiable solid additive carried by the petroleum wax.

15. The cover defined in claim 4, in which the additive is woody material.

16. A method for deterring emanation of malodorous gases from the surface of a pond, which comprises placing on the surface of the pond solidifiable buoyant material in liquid condition which material is nonmeltable at the maximum daily ambient atmospheric temperature and thereby building up a covering layer of a thickness of at least 3/16 in.

17. The method defined in claim 16, in which the solidifiable buoyant material includes petroleum wax.

18. The method defined in claim 16, including effecting solidification of the liquid buoyant material around anchoring members for limiting displacement of the solidified buoyant material from such anchoring members.

19. The method defined in claim 16, including placing the solidifiable buoyant material in liquid condition around reinforcement and embedding such reinforcement in the buoyant material by solidification thereof.

20. The method defined in claim 16, including placing the buoyant solidifiable material in liquid form on the surface of a pond above which a plurality of piles project, attaching the buoyant material in the form of a sheet to the piles by solidification of such material, and lowering the surface level of the pond and thereby suspending at least a portion of the solidified buoyant material above the surface of the pond.

21. The method defined in claim 16, including reinforcing the solidifiable buoyant material.

22. The method defined in claim 16, including embedding reinforcement in the solidifiable buoyant material.

23. The method defined in claim 16, including reinforcing the solidifiable buoyant material with a net.

24. The method defined in claim 16, including placing preformed sections of solid buoyant material on the surface of the pond in spaced relationship and thereafter placing on such surface the solidifiable buoyant material in liquid condition and thereby filling the space between the preformed sections.

25. The method defined in claim 24, in which the preformed sections of solid buoyant material and the solidifiable buoyant material in liquid form both include petroleum wax, and connecting together the preformed sections of solid buoyant material by bonding petroleum wax between them to the petroleum wax of the sections of solid buoyant material effected by solidification of such liquid buoyant material in contact with such sections of solid buoyant material.

26. The method defined in claim 24, including embedding a net in the solidifiable buoyant material.

27. The method defined in claim 16, in which the solidifiable buoyant material carries an additive including treating material.

28. The method defined in claim 27, in which the additive includes a deodorant.

29. The method defined in claim 27, in which the additive includes an oxidizer.

30. The method defined in claim 27, in which the additive includes anaerobic nutrient material.

31. A cover for a pond comprising a consolidated layer of buoyant material at least 3/16 in. thick, substantially impervious to gas and covering a major portion of the surface area of the pond, and reinforcement integral with said layer.

32. A method of applying covering to a pond which comprises placing preformed sections of solid buoyant material on the surface of the pond in spaced relationship and thereafter placing on such surface solidifiable buoyant material in liquid condition and thereby filling the space between the preformed sections.

* * * * *

UNITED STATES PATENT OFFICE
CERTIFICATE OF CORRECTION

Patent No. 4,066,400      Dated January 3, 1978

Inventor(s) James P. Cox and Robert W. Beach

It is certified that error appears in the above-identified patent and that said Letters Patent are hereby corrected as shown below:

Column 6, line 59, cancel "(CR)" and insert --(Cr)--.

Column 8, line 34, after "13." cancel "the" and insert --The--; line 40, cancel "4" and insert --14--.

Signed and Sealed this

Eighth Day of August 1978

[SEAL]

Attest:

RUTH C. MASON
Attesting Officer

DONALD W. BANNER
Commissioner of Patents and Trademarks